April 3, 1928.
E. FREDRICK
RESILIENT TIRE
Filed April 9, 1927
1,664,674
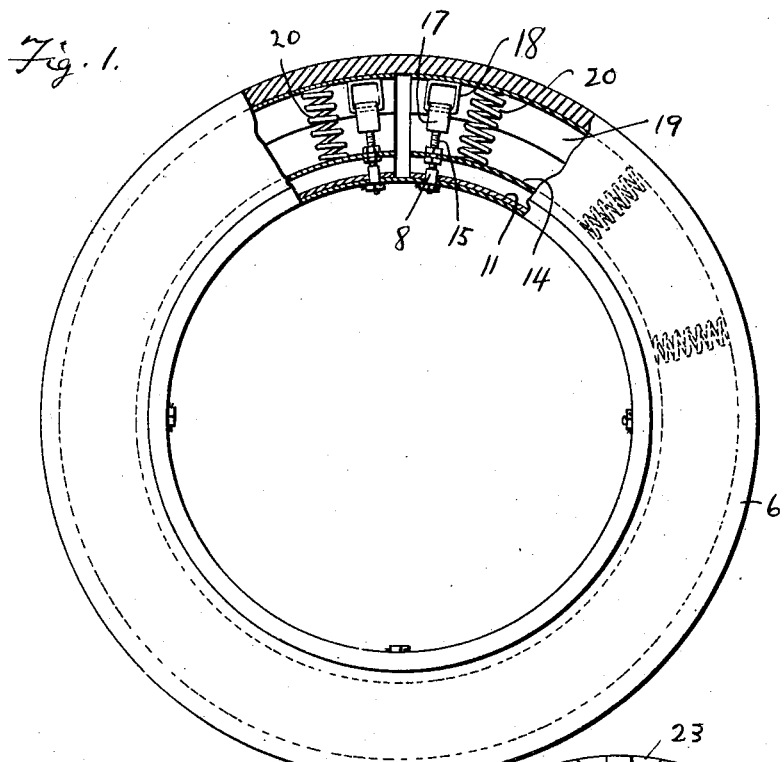
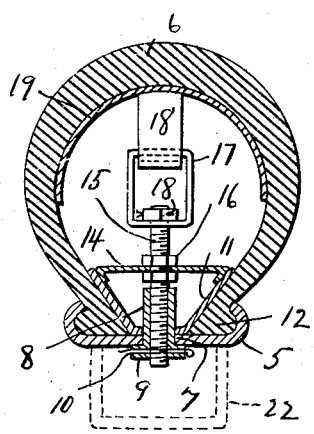
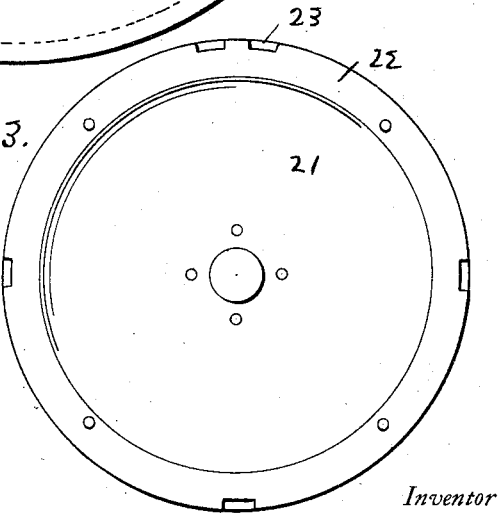
Inventor
Edgar Fredrick
By *Clarence A. O'Brien*
Attorney Patented Apr. 3, 1928.

1,664,674

UNITED STATES PATENT OFFICE.

EDGAR FREDRICK, OF NEW ORLEANS, LOUISIANA, ASSIGNOR OF ONE-HALF TO LOUIS J. LE BLANC, OF JEFFERSON PARISH, LOUISIANA.

RESILIENT TIRE.

Application filed April 9, 1927. Serial No. 182,423.

The present invention relates to a resilient tire adapted to take the place of the ordinary pneumatic tire now in common use on automobiles and other vehicles.

An important object of the invention resides in the provision of an efficient spring means for the pneumatic inner tube, which will eliminate the annoyances occasioned by punctures and the like.

Another very important object of the invention lies in the provision of a spring tire of this nature, which may be manufactured at a comparatively low cost and yet prove thoroughly efficient and reliable in operation and well adapted for the purpose for which it is designed.

With the above and numerous other objects in view, as will appear as the description proceeds, the invention resides in certain novel features of construction, and in the combination and arrangement of parts as will be hereinafter more fully described and claimed.

In the drawing,

Figure 1 is a side elevation partly broken away and partly in section of a tire embodying the features of my invention, Figure 2 is a transverse section therethrough, and Figure 3 is a side elevation of a disc wheel on which my tire structure may be mounted.

Referring to the drawing in detail, it will be seen that the numeral 5 denotes an ordinary rim for receiving an ordinary tire casing or shoe 6. The rim 5 has a plurality of openings 7 formed therein for receiving sleeves 8 which have lateral extensions 9, at their inner ends to receive cotter pins 10. A split ring channel plate 11 is mounted within the shoe 6, at the inner portion thereof to hold the beads 12 in the flanges of the rim 5. The sleeves 8 extend through openings in the bottom or inner portion of the channel plate 11. A split ring bracing plate 14 extends about the plate 11, across the edges thereof and is welded thereto. Bolts 15 extend through sleeves 8, being threaded therein, and pins 10 pierce the openings in these bolts, and hold them locked in position. Nuts 16 are mounted on the bolts, one on each side of the plate 14, at each bolt. Loop members 17 are engaged with the bolts 15 by nuts 18, and other loop members 18 have portions extending through the loop members 17 and are welded to split ring outer plate 19, which is bowed transversely with the concaved side inwardly. A plurality of coil springs 20 are secured to the plate 19 and the plate 14 to extend therebetween to normally hold the plate 19 outwardly from the plate 14. The plate 19 fits snugly within the outer portions of the casing.

This tire may be mounted on the disc wheel structure, such as is denoted at 21, of conventional construction, having the felly portion 22 channeled to receive the rim 5 and cut-outs 23 are provided to allow the passage of the inner ends of the bolts 15 and sleeves 8.

By removing the cotter pins 10, the sleeves 8 may be removed, thereby unloosening the plate 11 from the rim, since the bolt 15 is free to slide with respect to the loop 17, the beads 12 may be released from the flanges of the rim. This is necessary, in order that the new casing or shoe may be used when the same becomes worn out.

It is thought that the construction, operation and advantages of this invention will now become apparent to those skilled in this art, without a more detailed description thereof. The present embodiment of the invention has been disclosed in detail, merely by way of example, since in actual practice it retains the features of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

Having thus described my invention, what I claim as new is;

1. A split ring channel member for fitting inside a tire shoe, to hold the same with its beads engaged with the flanges of the rim, a closure plate for the channel member, a split ring plate, springs connecting the split ring plate with the closure plate, and link structures connecting the split ring plate with the assembled closure plate and channel member, said split ring plate adapted to fit in the outer portions of the tire shoe and being curved transversely for this purpose.

2. A split ring channel member for fitting inside a tire shoe, to hold the same with its beads engaged with the flanges of the rim, a closure plate for the channel member, a split ring plate, springs connecting the split ring plate with the closure plate, link structures connecting the split ring plate with the assembled closure plate and channel member, said split ring plate adapted to fit in the outer portions of the tire shoe and being curved transversely for this purpose, said link structures each comprising a pair of interconnected loops, one of which is secured to the split ring plate, a bolt secured to the other and extending through openings in the assembled closure plate and channel member.

3. A split ring channel member for fitting inside a tire shoe, to hold the same with its beads engaged with the flanges of the rim, a closure plate for the channel member, a split ring plate, springs connecting the split ring plate with the closure plate, link structures connecting the split ring plate with the assembled closure plate and channel member, said split ring plate adapted to fit in the outer portions of the tire shoe and being curved transversely for this purpose, said link structures each comprising a pair of interconnected loops, one of which is secured to the split ring plate, a bolt secured to the other and extending through openings in the assembled closure plate and channel member, sleeves over the bolts and threadedly engaged therewith for extending through openings in the tire rim.

In testimony whereof I affix my signature.

EDGAR FREDRICK.